US012314322B2

(12) United States Patent
Olarig et al.

(10) Patent No.: US 12,314,322 B2
(45) Date of Patent: May 27, 2025

(54) METHOD AND APPARATUS FOR SUPPORTING MACHINE LEARNING ALGORITHMS AND DATA PATTERN MATCHING IN ETHERNET SSD

(71) Applicant: Samsung Electronics Co., Ltd., Suwon-si (KR)

(72) Inventors: Sompong P. Olarig, Pleasanton, CA (US); Fred Worley, San Jose, CA (US); Nazanin Farahpour, Los Angeles, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 933 days.

(21) Appl. No.: 17/322,601

(22) Filed: May 17, 2021

(65) Prior Publication Data
US 2021/0279285 A1 Sep. 9, 2021

Related U.S. Application Data

(63) Continuation of application No. 15/472,061, filed on Mar. 28, 2017, now Pat. No. 11,010,431.

(Continued)

(51) Int. Cl.
*G06F 16/9038* (2019.01)
*G06F 16/583* (2019.01)
(Continued)

(52) U.S. Cl.
CPC ........ *G06F 16/9038* (2019.01); *G06F 16/583* (2019.01); *G06F 16/951* (2019.01);
(Continued)

(58) Field of Classification Search
None
See application file for complete search history.

(56) References Cited

U.S. PATENT DOCUMENTS

| 7,401,253 B2 | 7/2008 | Winarski et al. |
| 7,567,252 B2 | 7/2009 | Buck et al. |

(Continued)

FOREIGN PATENT DOCUMENTS

| KR | 10-2006-0118598 A | 11/2006 |
| KR | 10-2008-0086227 A | 9/2008 |

(Continued)

OTHER PUBLICATIONS

Metz et al., Under the Hood with NVMe over Fabrics, SNIA Ethernet Storage Forum, Dec. 15, 2015, Total p. 47 (Year: 2015).*

(Continued)

*Primary Examiner* — Alan Chen
(74) *Attorney, Agent, or Firm* — Lewis Roca Rothgerber Christie LLP

(57) ABSTRACT

A data storage device includes a memory array for storing data; a host interface for providing an interface with a host computer running an application; a central control unit configured to receive a command in a submission queue from the application and initiate a search process in response to a search query command; a preprocessor configured to reformat data contained in the search query command and generate a reformatted data; and one or more data processing units configured to extract one or more features from the reformatted data and perform a data operation on the data stored in the memory array in response to the search query command and return matching data from the data stored in the memory array to the application via the host interface.

20 Claims, 7 Drawing Sheets

Related U.S. Application Data

(60) Provisional application No. 62/441,073, filed on Dec. 30, 2016.

(51) Int. Cl.

| | | |
|---|---|---|
| *G06F 16/951* | (2019.01) | |
| *G06N 3/045* | (2023.01) | |
| *G06N 3/048* | (2023.01) | |
| *G06N 3/08* | (2023.01) | |
| *G06T 1/20* | (2006.01) | |
| *G06T 11/00* | (2006.01) | |

(52) U.S. Cl.
CPC ............. *G06N 3/045* (2023.01); *G06N 3/048* (2023.01); *G06N 3/08* (2013.01); *G06T 1/20* (2013.01); *G06T 11/001* (2013.01)

(56) References Cited

U.S. PATENT DOCUMENTS

| | | |
|---|---|---|
| 7,881,525 B2 | 2/2011 | Mattausch et al. |
| 8,634,247 B1 | 1/2014 | Sprouse et al. |
| 8,792,279 B2 | 7/2014 | Li et al. |
| 9,053,008 B1 | 6/2015 | Horn |
| 9,158,540 B1 | 10/2015 | Tzelnic et al. |
| 9,171,264 B2 | 10/2015 | Finocchino |
| 9,182,912 B2 | 11/2015 | Bert |
| 9,330,143 B2 | 5/2016 | Obukhov et al. |
| 9,396,415 B2 | 7/2016 | Chertok et al. |
| 9,450,606 B1 | 9/2016 | Winter |
| 10,140,063 B2 | 11/2018 | Worley et al. |
| 10,210,196 B2 | 2/2019 | Kim et al. |
| 10,467,037 B2 | 11/2019 | Choi et al. |
| 10,545,861 B2 | 1/2020 | Preier et al. |
| 2005/0125369 A1 | 6/2005 | Buck et al. |
| 2012/0096237 A1 | 4/2012 | Punkunus |
| 2015/0019506 A1 | 1/2015 | Aronovich |
| 2015/0149695 A1 | 1/2015 | Khan |
| 2015/0100860 A1 | 4/2015 | Lee et al. |
| 2015/0317176 A1 | 11/2015 | Hussain et al. |
| 2016/0170892 A1 | 6/2016 | Hall et al. |
| 2016/0188207 A1 | 6/2016 | Choi et al. |
| 2016/0224544 A1 | 8/2016 | Tristan et al. |

FOREIGN PATENT DOCUMENTS

| | | |
|---|---|---|
| KR | 10-2013-0098470 A | 9/2013 |
| KR | 10-2016-0096279 A | 8/2016 |
| KR | 10-2016-0106501 A | 9/2016 |

OTHER PUBLICATIONS

Lockwood et al., Storage 2020: A Vision for the Future of HPC Storage, National Energy Research Scientific Computing Center Lawrence Berkeley National Laboratory; Report No. LBNL-2001072; Oct. 20, 2017; Total Pages 37 (Year: 2017).*

Castelli, Vittorio et al.; Image Databases—Search and Retrieval of Digital Imagery; 2002; John Wiley & Sons, Inc.; 595 pages. (Year: 2002).

Babenko, Artem et al.; Aggregating Deep Convolutional Features for Image Retrieval; 2015 IEEE International Conference on Computer Vision; pp. 1269-1277. (Year: 2015).

Babenko, Artem et al.; Neural Codes for Image Retrieval; Springer International Publishing Switzerland 2014; ECCV 2014, Part I, LNCS 8689, pp. 584-599. (Year: 2014).

Alzu'bu, Ahmad et al.; Semantic content-based image retrieval: A comprehensive study; Elsevier; J. Vis. Commun. Image R. 32 (2015) 20-54. (Year: 2015).

Novak, David et al.; Large-scale Image Retrieval using Neural Net Descriptors; 2 pages. SIGIR'15, Aug. 9-13, 2015, Santiago, Chile. ACM 978-1-4503-3621—May 15, 08. DOI: http://dx.doi.org/1 0.1145/2766462.2767868. (Year: 2015).

* cited by examiner

METHOD AND APPARATUS FOR SUPPORTING MACHINE LEARNING ALGORITHMS AND DATA PATTERN MATCHING IN ETHERNET SSD

CROSS-REFERENCE TO RELATED APPLICATION(S)

This application is a continuation application of U.S. patent application Ser. No. 15/472,061 filed Mar. 28, 2017, which claims the benefits of and priority to U.S. Provisional Patent Application Ser. No. 62/441,073 filed Dec. 30, 2016, the disclosures of which are incorporated herein by reference in their entirety.

TECHNICAL FIELD

The present disclosure relates generally to data storage devices, and more particularly to data storage devices that are capable of performing data matching and machine learning on the data stored thereon.

BACKGROUND

Non-volatile memory (NVMe) over Fabrics (NVMeoF) is a new industry standard. NVMeoF defines a common architecture that supports an NVMe block storage protocol over a wide range of storage networking fabrics such as Ethernet, Fibre Channel, InfiniBand, and other network fabrics. For an NVMeoF-based system, an X86-based central processing unit (CPU) on a motherboard is no longer required to move data between an initiator (e.g., host software) and a target device (i.e., an NVMeoF device) because the target device is capable of moving data by itself. The term, fabric, represents a network topology in which network nodes can pass data to each other through a variety of interconnecting protocols, ports, and switches. For example, Ethernet-attached SSDs may attach directly to a fabric, and in this case the fabric is the Ethernet.

The standard form factor of NVMeoF devices is the same or very similar to the standard solid-state drive (SSD) and hard disk drive (HDD) to enable quick and easy deployment in existing rack systems in an enterprise or a datacenter. The NVMeoF devices provide high capacity, low latency data storage and operation environment for enterprise or datacenter applications.

The NVMeoF devices are not optimized for data-centric applications such as machine learning and data mining applications. Currently, NVMeoF devices including fabric-attached SSDs (eSSDs) merely respond to a request by an application running on a host computer and provide data requested by the application or perform only basic operations on the data stored thereon. Most of the data matching or machine learning capabilities are performed by CPUs and/or graphics processing units (GPUs) on a host computer that are external to the NVMeoF devices.

SUMMARY

According to one embodiment, a data storage device includes a memory array for storing data; a host interface for providing an interface with a host computer running an application; a central control unit configured to receive a command in a submission queue from the application and initiate a search process in response to a search query command; a preprocessor configured to reformat data contained in the search query command based on a type of the data and generate a reformatted data; and one or more data processing units configured to extract one or more features from the reformatted data and perform a data operation on the data stored in the memory array in response to the search query command and return matching data from the data stored in the memory array to the application via the host interface.

A method for operating a data storage device includes: receiving a command in a submission queue from an application running on a host computer; initiating a search process in response to a search query command; generating a reformatted data by changing a format of data contained in the search query command based on a type of the data; extracting one or more features from the reformatted data; performing a data operation on data stored in a memory array of the data storage device in response to the search query command; and returning matching data from the data stored in the memory array to the application via a host interface established between the host computer and the data storage device.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
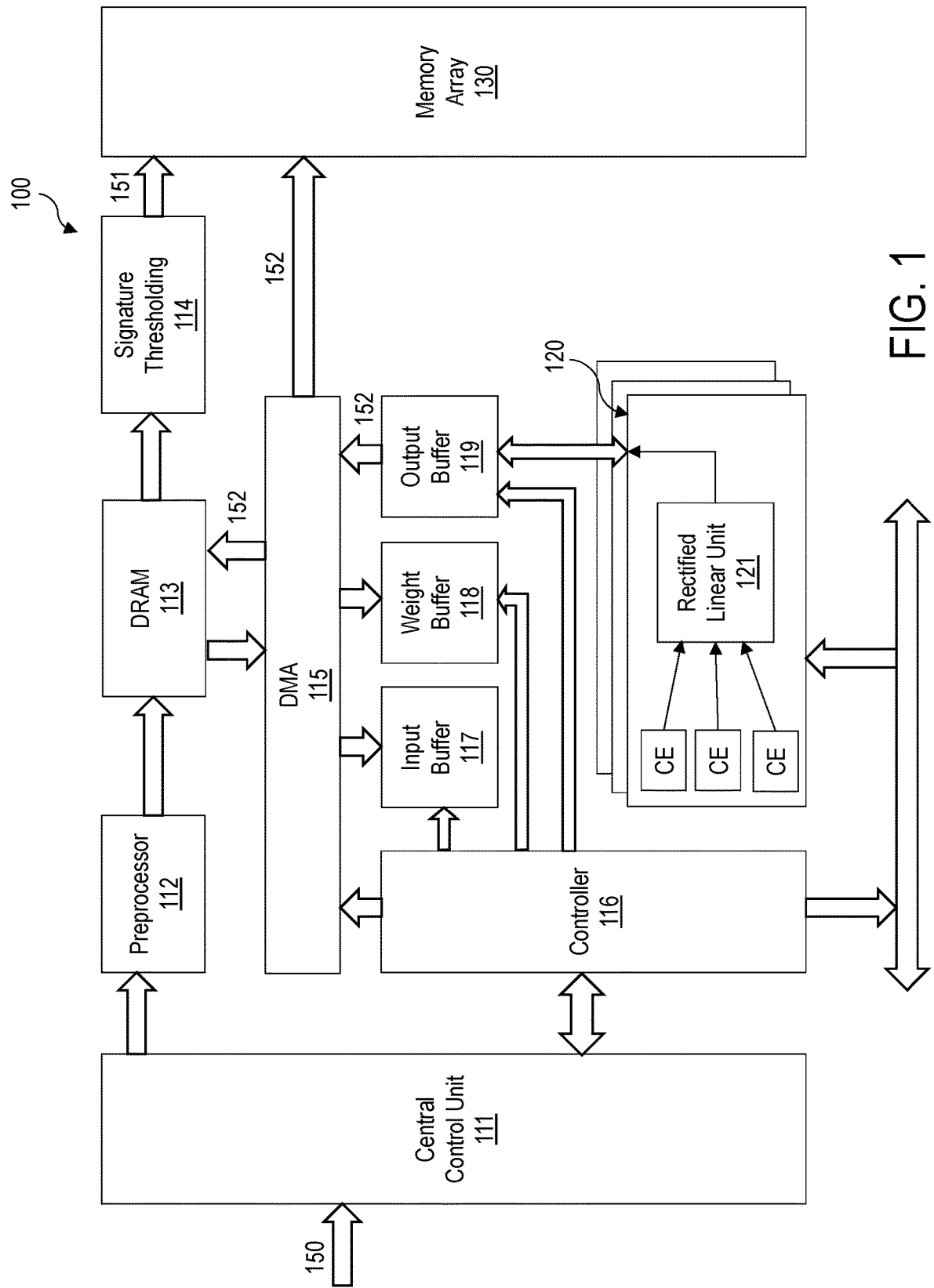
FIG. 1 shows a block diagram of an example data storage device, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

In an embodiment of the present disclosure, a data storage device capable of data matching and machine learning is disclosed. Machine learning can include algorithms that can learn from data including artificial intelligence, getting computers to act without being explicitly programmed, automated reasoning, automated adaptation, automated decision making, automated learning, the ability for a computer to learn without being explicitly programmed, artificial intelligence (AI), or combination thereof. Machine learning can be considered a type of artificial intelligence (AI). Machine learning can include classification, regression, feature learning, online learning, unsupervised learning, supervised learning, clustering, dimensionality reduction, structured prediction, anomaly detection, neural nets, or combination thereof.

In an embodiment of the present disclosure, a learning system can include machine learning systems that can process or analyze "big data." Parallel or distributed storage devices with in-storage-computing (ISC) can accelerate big data machine learning and analytics. The parallel or distributed learning system can offload functions to ISC for additional bandwidth and reduce input and output (I/O) for the storage and host processor. This parallel or distributed learning system can provide machine learning with ISC.

In an embodiment of the present disclosure, a parallel or distributed learning system can be implemented with in-storage-computing (ISC), a scheduler, or combination thereof. ISC can provide significant improvements in the learning system including parallel or distributed learning. ISC can provide another processor for machine learning, an accelerator for assisting a host central processing unit, or combination thereof, such as preprocessing at an ISC to relieve a bandwidth bottleneck once detected. The scheduler can intelligently assign data, tasks, functions, operations, or combination thereof.

The following embodiments are described in sufficient detail to enable those skilled in the art to make and use the present disclosure. It is to be understood that other embodiments would be evident based on the present disclosure, and that system, process, or mechanical changes may be made without departing from the scope of an embodiment of the present disclosure.

In the following description, numerous specific details are given to provide a thorough understanding of the present disclosure. However, it will be apparent that the present disclosure may be practiced without these specific details. In order to avoid obscuring an embodiment of the present disclosure, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the present disclosure can be operated in any orientation. The embodiments have been numbered first embodiment, second embodiment, etc. as a matter of descriptive convenience and are not intended to have any other significance or provide limitations for an embodiment of the present disclosure.

According to one embodiment, a host computer and one or more data storage devices can collectively perform data matching or machine learning operations. Depending on the datasets and the algorithms that are employed, the data matching or machine learning operations can be partitioned into host operations and device operations. The partitioning into the host operations and the device operations can depend on the optimization of a computational time and power efficiency for operating on a specific usage model. If a specific part of the data matching or machine learning operations performed by a subsystem (either the host computer or the data storage device) can result in a faster and more efficient execution, that specific part of the operations can be partitioned into the corresponding subsystem.

For example, in a facial recognition operation, the dataset of trained faces may be stored in a data storage device. The dataset of trained faces may include binary codes or feature vectors extracted from the trained face images. For training of a new face, the entire or a part of the newly trained facial dataset or data model can be copied from the data storage device to a memory of the host computer. The host computer can perform the new facial training operation using the dataset copied to the host computer's memory. That is, the data storage device may receive the data of the new face and send corresponding neural binary codes or feature vectors to facilitate the new facial training operation performed by the host computer. Once a new facial recognition model is completed, the host computer can keep the newly trained facial recognition model in the host computer's memory for an additional training or copy the newly trained facial recognition model back to the data storage device to update the dataset of trained faces. This process can repeat for a newly received facial dataset and training for a new model based on the facial dataset.

According to one embodiment, the host computer can perform the data matching or machine learning operations in a framework that supports coordination with the data storage device that stores the dataset. The performance of the framework can be highly dependent on the usage model and deployment parameters, such as a size of the images, a number of training iterations, a size of the dataset, a training algorithm, a floating-point performance, etc. For example, in the case of facial recognition, the size of the dataset of trained faces may get larger over time. Because the memory of the host computer is costly, the data storage device can partially or fully perform the facial recognition operation instead of copying the dataset stored in the data storage device to the memory of the host computer to perform the data matching or machine learning operations in the host computer.

According to one embodiment, the present disclosure provides a data storage device that can internally perform data matching or machine learning operations. The data storage device can be any of a solid-state drive (SSD), a hard disk drive (HDD), an NVMe device that is compatible with the NVMe standard, an NVMeoF device that is compatible with the NVMeoF standard, or any other fabric-attached SSDs (eSSDs). It is noted that any other type of devices that can store data and perform data matching or machine learning can be used without deviating from the scope of the present disclosure.

FIG. 1 shows a block diagram of an example data storage device, according to one embodiment. The data storage device 100 includes a central control unit (CCU) 111, a preprocessor 112, an embedded DRAM 113, a signature thresholding engine 114, a direct memory access (DMA) engine 115, a controller 116, an input buffer 117, a weight buffer 118, an output buffer 119, one or more processing units 120, and a memory array 130. Various images, text, video, audio, or other data can be stored in the memory array 130. Although the memory array 130 is shown to be local to the data storage device 100, it is noted that the memory array 130 can be remotely connected to the data storage device 100 via the fabrics such as the Ethernet. For example, the memory array 130 can be a flash array that may reside in another NVMeoF device. In particular, according to the NVMeoF standard, the placement and physical attachment of the memory array 130 may not be a physical limitation in that the data stored in the memory array 130 can be accessed by any host computer accessible by the NVMeoF protocols. In this way, the controller 116 and the one or more data processing units 120 of one data storage device can operate on data stored in the memory array 130 of itself or another data storage device over the fabrics.

According to one embodiment, the data storage device 100 can be integrated circuits, integrated circuit cores, integrated circuit components, microelectromechanical system (MEMS), passive devices, or a combination thereof having a form factor compatible with the NVMe and/or NVMeoF standards. However, it is noted that various form factors of the data storage device 100 can be used without deviating from the scope of the present disclosure.

According to one embodiment, the data storage device 100 is an NVMeoF device, and the connection between a host computer (not shown) and the fabric attached to the NVMeoF device is an Ethernet connection. In this case, the host computer can send NVMeoF commands directly to the NVMeoF device over the Ethernet connection. It is noted that various other fabrics such as Fibre Channel, InfiniBand, and other network fabrics can be used to establish the communication between the data storage device 100 and the host computer.

The data storage device 100 can receive a command 150 from an application running on the host computer. According to one embodiment, the command 150 can be a vendor-specific fabric command (e.g., an NVMeoF command). The command 150 can be a normal read/write operation command, an image search inquiry command, or a machine learning command to operate on the data stored in the memory array 130. The command 150 can be received in a submission queue (SQ). One submission queue can include several commands 150. In some embodiments, a single submission queue can include the same or similar type of commands 150, for example, read/write operation commands. Similar or same commands 150 can be sorted by the application and packaged in different submission queues for efficient delivery and processing of the commands 150.

The controller 116 is configured to perform various data operations including data matching and/or machine learning operations on the data stored in the memory array 130. For example, the controller 116 can run a state machine or perform data matching operations in conjunction with the CCU 111. The data storage device 100 can internally perform the data operations with no or minimal interaction with the application or with the host computer. In this case, the latency to complete the requested operation can be improved with less power consumed due to less data movement between the host and the data storage device. When the requested data operation is completed, the data storage device 100 provides the matching data to the application running on the host computer.

According to one embodiment, the CCU 111 can decode the command 150 received from the host computer and generate one or more neural binary codes for internal and external consumption. For example, in response to an image search query command including an image data, the CCU 111 initializes the preprocessor 112 to operate on the received image data. In some embodiments, the data storage device 100 can receive only the command 150 from the application to perform a data operation on the dataset that are stored in the memory array 130 instead of receiving both the command and dataset from the host computer. Examples of such data include but are not limited to, image data, text data, video data, and audio data. For example, for image data, the preprocessor 112 can convert the format of the image data and create a fixed-size RGB format data. The converted image data in the RGB format may further be scaled up or down for facilitating the extraction of various features from the image data. The analysis-ready fixed-size image data are saved in the DRAM 113 for the data operation as instructed by the command 150.

According to one embodiment, the data processing unit 120 is a neural code accelerator. Several data processing units 120 may be required for processing data on each of the received image data. For example, if ten images are received from the application in the command 150, a total of ten data processing units 120 can be invoked by the CCU 111. The number of invoked data processing units 120 may not necessarily match the number of received image data. Depending on the current workload and the availability of the data processing units 120, the CCU 111 can invoke a certain number of data processing units 120. In some embodiments, the data processing can be divided, grouped, or work in parallel or in series depending on the workload and the availability of the data processing units 120.

According to one embodiment, each of the data processing units 120 can incorporate one or more convolution engines (CEs). The image data (e.g., a facial image) received from the application are input to the data processing units 120 in batches, and each of the convolution engines can extract feature sets for each dataset that is grouped in batches. The feature sets that are extracted in parallel can be connected based on their weights. During the reconnection of the feature sets, the convolution weight parameters for each feature set can be loaded from the DRAM 113 via the weight buffer 118.

The data processing unit 120 can also have adder trees and optional pooling, and a rectified linear unit 121 to compute and connect the feature sets to compute the fully-connected neural layers. Using the fully-connected neural layers, herein also referred to as convolution neural network (CNN) layers, the data processing unit 120 can generate a feature vector 152 and send the feature vector 152 to the DRAM 113 via the DMA 115. The feature vector 152 can be converted to binary vectors and saved to the memory array 130. The feature vector 152 can be fetched by another processing unit (e.g., the signature thresholding 114) for compressing the feature vector 152 and comparing the extracted features (e.g., binary codes) with the saved features for the database images stored in the memory array 130. For hierarchical data retrieval, both binary and actual feature vectors can be saved to the memory array 130.

According to one embodiment, the rectified linear unit 121 implemented in each data processing engine 120 can provide a rectifier by employing an activation function for given inputs received from the associated convolution engines. For example, the rectified linear units 12 are applicable to computer vision using deep neural nets.

Figure 2:
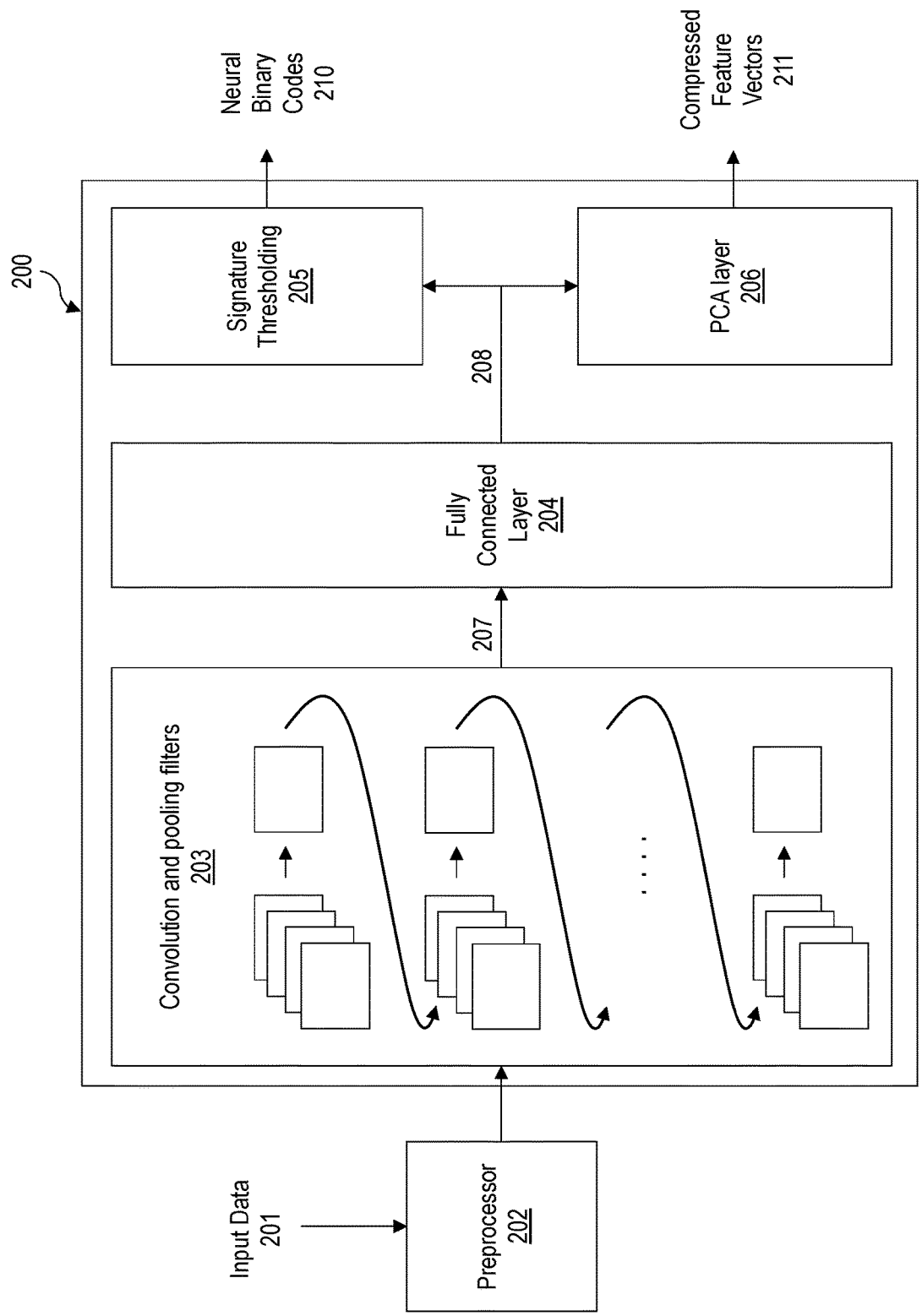
FIG. 2 is a block diagram illustrating a behavioral view of an example neural code accelerator, according to one embodiment.

FIG. 2 is a block diagram illustrating a behavioral view of an example neural code accelerator, according to one embodiment. The neural code accelerator 200 includes a convolution and pooling filters 203, a fully connected layer 204, and a signature thresholding unit 205. The neural code accelerator 200 can optionally have a principal component analysis (PCA) layer 206. The neural code accelerator may be the data processing unit 120 shown in FIG. 1.

The neural code accelerator 200 can receive an input data 201 from a data buffer (e.g., a submission queue) from a host computer or a central control unit (e.g., CCU 111 shown in FIG. 1). A preprocessor 202 (e.g., preprocessor 112 shown in FIG. 1) can receive the input data 201. The input data 201 can be any type of data including, but not limited to, text, image, video, and audio data. According to some embodiments, the preprocessor 202 can be a part of or integrated into the neural code accelerator 200. For image data, the preprocessor 202 can perform initial processing of input data 201 to convert it to a raw RGB format and scale the image up or down to a fixed dimension. The convolution and pooling filters 203 can perform data processing on the converted and/or scaled data with a set of convolution filters. The output from the convolution and pooling filters 203 can be one or more features 207. The features 207 are fed to the fully connected layer 204. The fully connected layer 204 can generate a feature vector 208 based on the features 207 and feed the feature vector 208 to the signature thresholding unit 205 and optionally to the PCA layer 206. The signature thresholding unit 205 can generate one or more neural binary codes 210. For example, for an image data that is input to the neural code accelerator 200, the fully connected layer 204 can generates the feature vector 208, and the signature thresholding unit 205 can generate the neural binary codes 210 by finalizing activations of the feature vector 208 based on a predetermined threshold. The threshold may be fine-tuned by a user, training, or machine learning. The PCA layer 206 can condense the output feature vector 208 to generate compressed feature vectors 211.

According to one embodiment, the convolution engines can internally perform data matching and/or deep learning operations inside a data storage device. For example, the data storage device can have a plurality of GPUs, and each of the GPUS can include one or more convolution engines that are grouped in an input layer, a hidden layer, and an output layer.

Figure 3:
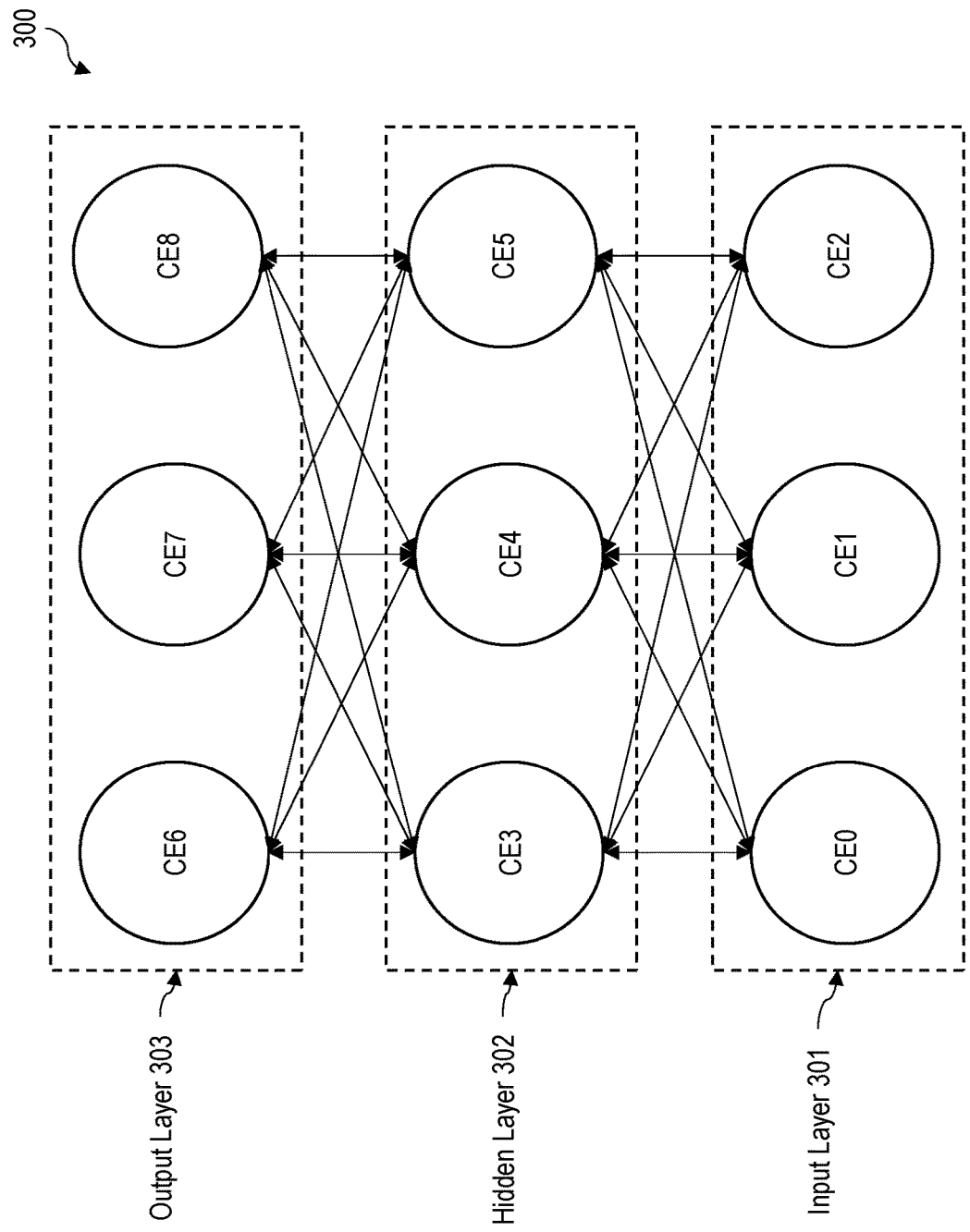
FIG. 3 shows an example GPU configured to implement one or more convolution engines (CEs), according to one embodiment.

FIG. 3 shows an example GPU configured to implement one or more convolution engines (CEs), according to one embodiment. The GPU 300 can run one or more CEs that are pre-programmed with fixed algorithms such as K-means or regression. A first group of the CEs are implemented as an input layer 301, a second group of the CEs are implemented as a hidden layer 302, and the third group of the CEs are implemented as an output layer 303. The data paths from the input layer 301 to the output layer 303 through the hidden layer 302 provide a forward path or an inference path. The data paths from the output layer 303 to the input layer 301 through the hidden layer 302 provide a backward or training path. The application can directly utilize the GPU 300 without having to download a specific algorithm because the CEs implemented in the GPU 300 are preprogrammed with algorithms such as K-means or regression that are applicable to a variety of analysis and deep learning. The data storage device implementing the GPU 300 can be a consumer device or a home device that can feature a machine learning capability.

According to one embodiment, the data storage device incorporates an additional data matching logic (e.g., XOR) and DMA engines. The data storage device can perform data matching in real time or as a background task. The application can provide one or more parameters for a matching data (e.g., raw binary values) to the data storage device, and the data storage device can internally execute and complete the pattern matching for the data, and return the matching data stored in the memory array to the application. In some embodiments, the data storage device can have one data matching (XOR) engine per bank/channel of a NAND array. For example, if the data storage device employs N number of independent channels/banks of the memory array (e.g., NAND array), a total of N XOR engines can be used to match the data from each NAND channel, where N is an integer number.

Figure 4:
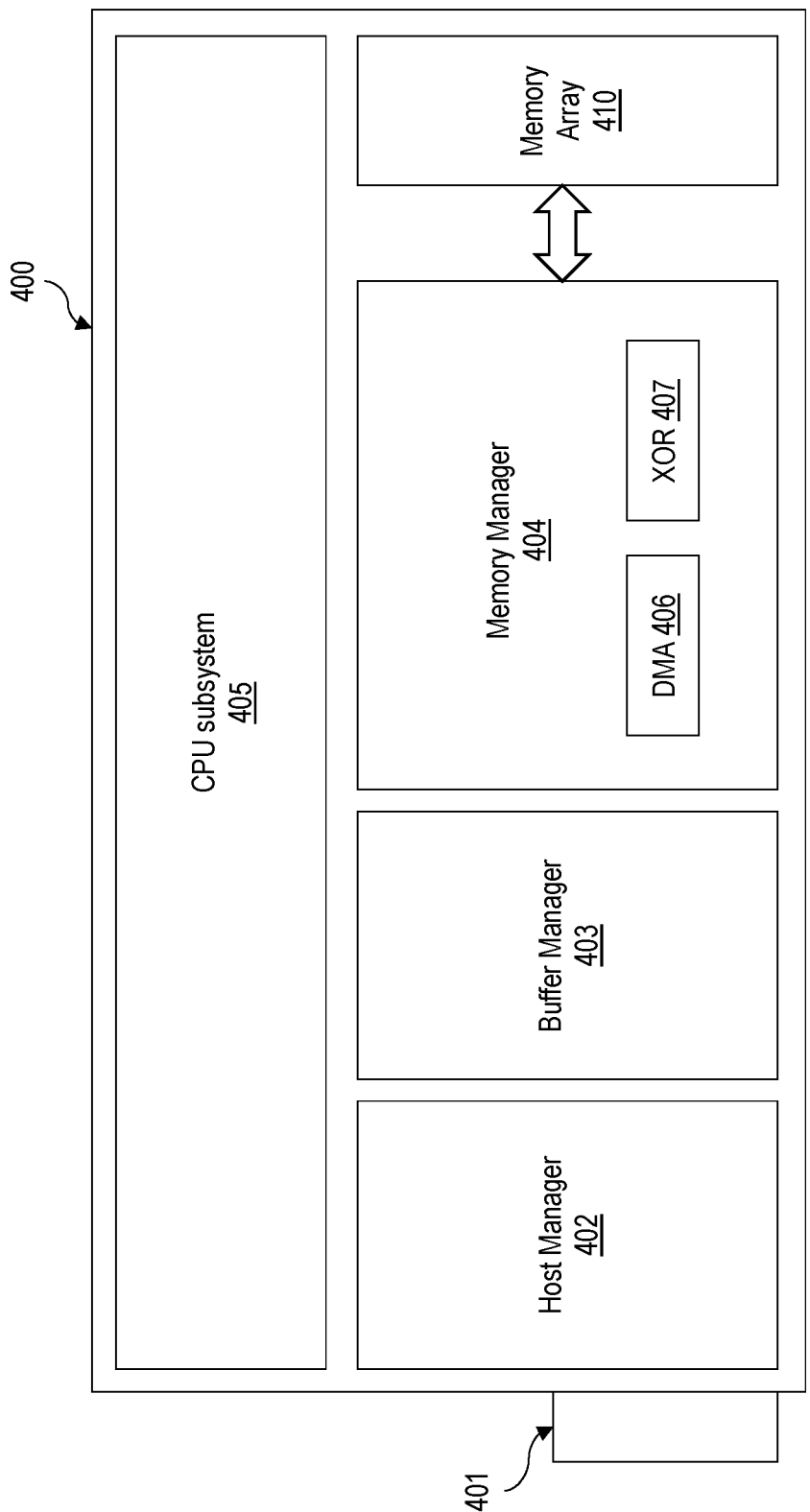
FIG. 4 shows an example data storage device including an XOR engine, according to one embodiment.

FIG. 4 shows an example data storage device including an XOR engine, according to one embodiment. The data storage device 400 can be an NVMeoF device that is capable of processing and moving data itself to and from a host computer. The host computer can run an application and communicate with the storage device 400 via the fabric interface. The data storage device 400 can include a host manager 402 that interfaces with the host computer via a host interface 401 (e.g., U.2 connector), a buffer manager 403 including a DRAM controller and a memory interface (e.g., DDR3 and DDR4), a memory manager 404 (e.g., flash manager) including a DMA engine 406 and an XOR engine 407, a CPU subsystem 405, and a memory array 410 (e.g., flash memory).

The XOR engine 407 is configured to perform in-line data matching in response to a data matching request received from the application. After performing the in-line data matching operation, the data storage device 400 can provide the matching data to the requesting application via the connector 401. The XOR engine 407 may be implemented in an existing hardware logic of the memory manager 404. This is cost effective because an additional hardware logic to implement the XOR engine 407 is not necessary. The DMA engine 406 can be used to transfer the matching data to the requesting application.

Figure 5:
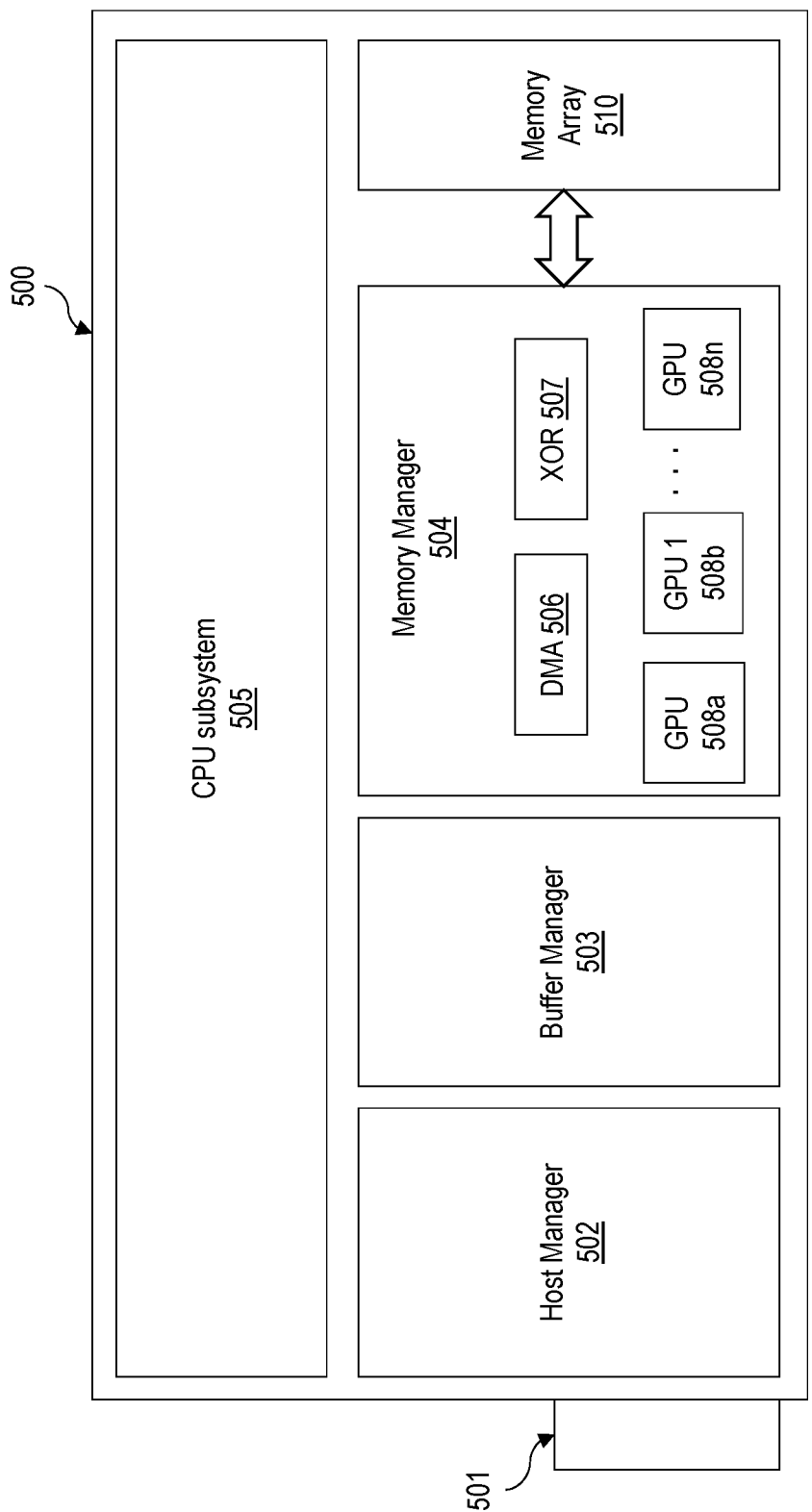
FIG. 5 shows an example data storage device including a GPU for machine learning, according to one embodiment.

FIG. 5 shows an example data storage device including a GPU for machine learning, according to one embodiment. The data storage device 500 can be an NVMeoF device that is capable of processing and moving data itself to and from a host computer. The host computer can run an application via the fabrics that provides a communication path with the data storage device 500. The data storage device 500 can include a CPU subsystem 505, a host manager 502 that interfaces with the host computer via a host interface 501 (e.g., U.2 connector), a buffer manager 503 including a DRAM controller and a memory interface (e.g., DDR3 and DDR4), and a memory manager 504 (e.g., flash manager) including a DMA engine 506, an XOR engine 507, and one or more GPUs 508a-508n. The memory manager 504 can control access to the memory array 510 (e.g., flash memory) using the DMA engine 506, the XOR engine 507, and the GPUs 508. The GPUs can be configured to function as a convolution engine (CE) in an input layer, a hidden layer, and an output layer as shown in FIG. 3. The data storage device implementing the GPUs can be a consumer device or a home device that can feature a machine learning capability.

According to one embodiment, the present data storage device can store images in the memory array and internally run an image retrieval application in response to an image retrieval request from a host computer. In other embodiments, the storage device may store other types of data, such as text, audio, or video, among others. Herein, the case of image data will be used an example. One skilled in the art will recognize that the teachings are applicable to other data types as well.

According to one embodiment, the data storage device extract features from a received image data using one or more convolution neural network (CNN) engines. Referring to FIG. 1, the CNN refers to the collection of the convolution engines contained in the data storage device 100. The memory array 130 of the data storage device 100 can contain images with searchable image descriptor index values and other values to compute Hamming distances with respect to a requested image data during an image query search and retrieval process.

The CNN engines can create a binary neural code (herein also referred to as a binary key) that can be used for interrogation and/or comparison against the database images stored in the data storage device. In one embodiment, the binary neural code refers to a key that is stored in a metadata of each stored image data. The CNN engines can provide a key of better quality. In one embodiment, the key can be created by deep learning performed elsewhere to generate a partial result. As more deep learning or image processing occurs, more refined keys can be generated, and the image retrieval process be become faster and more efficient.

According to one embodiment, the creation of the binary keys can use various forms, sizes, and types of the input data. For example, the preprocessor of the data storage device can convert the format of an input image to a fixed sized format (e.g., RGB 256×256 bitmap). For other types of data (such as text, audio, or video data), other reformatting or normalization process may be done by the pre-processor to format the input data, depending on the data type, and as would be recognized by one having skill in the art. The preprocessed input image (or other data) is fed to the CNN engines. The CNN engines process the input image, loop iteratively, extracting one or more binary codes. The extracted binary codes are placed in the metadata of associated with the input image (or other data) for searching and selecting matching data stored in the data storage device.

According to one embodiment, the search and the selection process can accept a search value, create a search signature, and compare the search signature with an existing signature. In one embodiment, the search process can calculate Hamming distances, and select matching data that has a Hamming distance less than a threshold value. The binary search and selection algorithm based on a k-nearest neighbor search in a Hamming space is well known in the art, for example, in an article entitled "Fast Exact Search in Hamming Space with Multi-Index Hashing" IEEE Transactions on Pattern Analysis and Machine Intelligence archive, volume 36 Issue 6, June 2014, page 1107-1119.

Figure 6A:
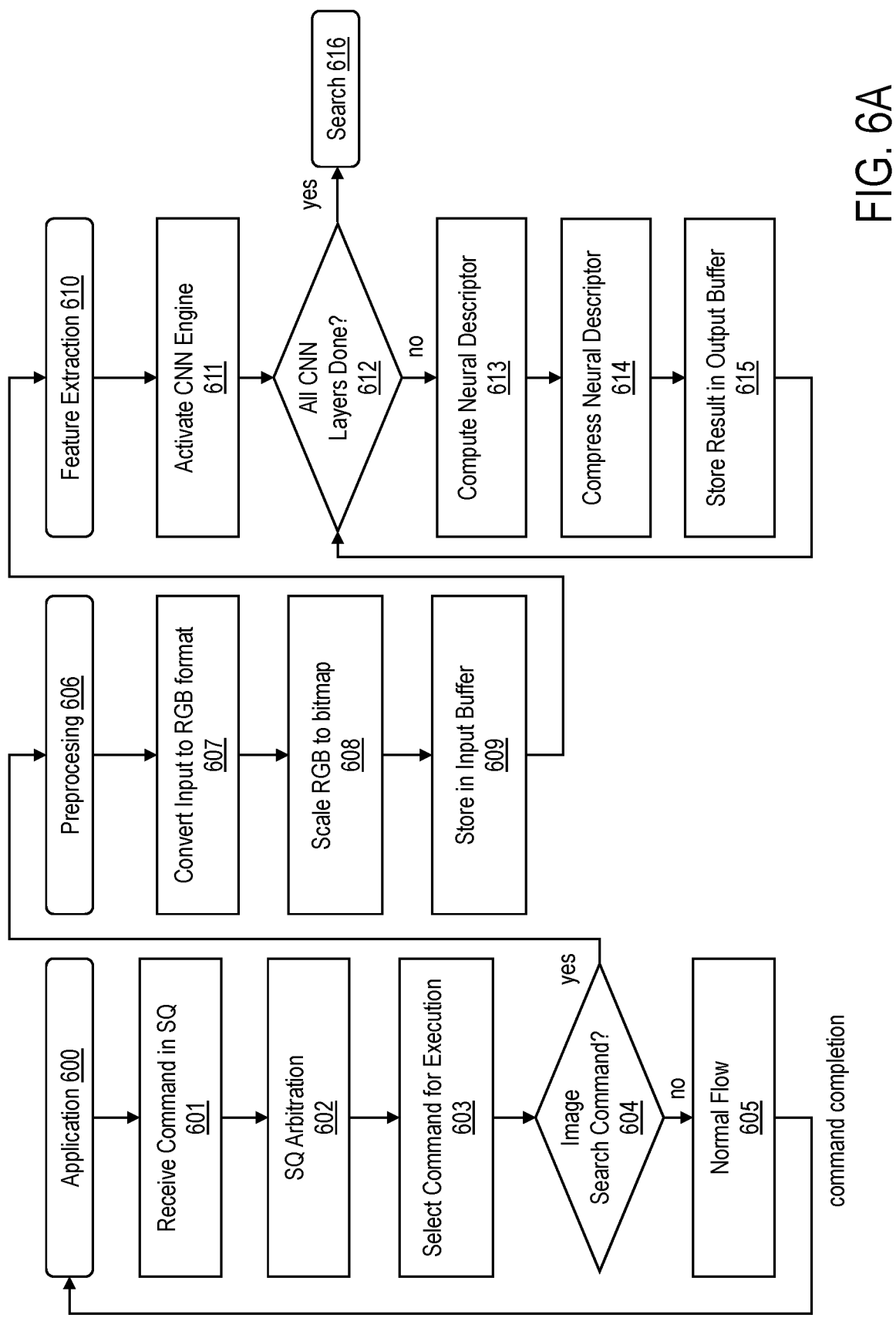
FIGS. 6A and 6B show a flowchart for an example image search query and retrieval process, according to one embodiment.
Figure 6B:
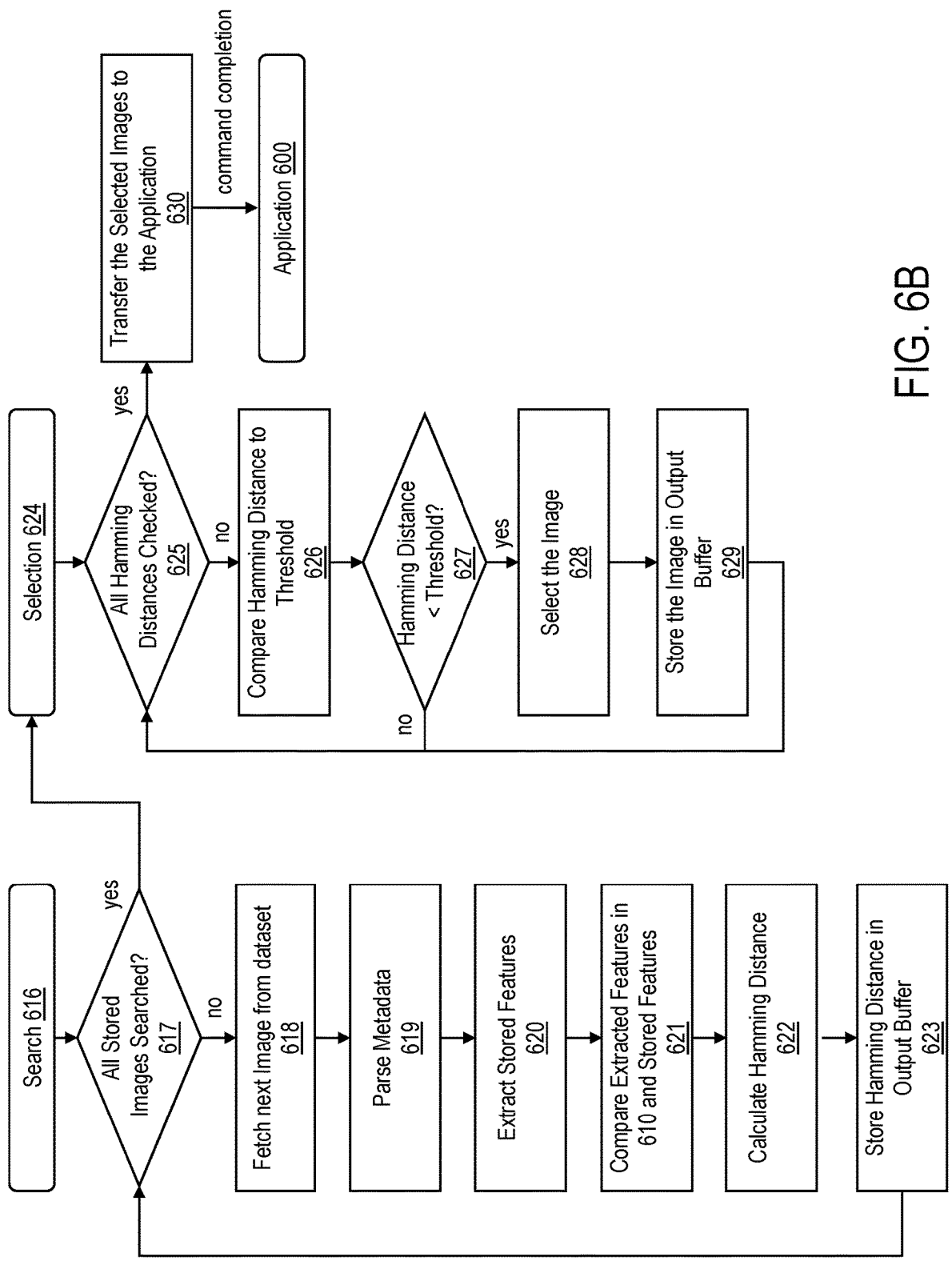

FIGS. 6A and 6B show a flowchart for an example image search query and retrieval process, according to one embodiment. An application 600 submits a sample image a data storage device. The application 600 submits a search request to the data storage device by placing an image and associated query information in a submission queue (SQ).

A submission queue can include several search requests submitted from the application 600, and the application 600 can submit several submission queues to the data storage device. The submission queues can be submitted to the data storage device in various ways. For example, the submission queues can be consumed by the data storage device on a predetermined interval or on a first-come first-serve basis. In another example, the data storage device can be notified that the submission queues are ready for serving via a message from the application 600, and the data storage device can serve the submission queues one at a time. Depending on the urgency or priority, submission queues can be reordered, and search requests in a submission queue can be reordered.

A submission queue from the application 600 can include a command associate with a request contained in the submission queue. For example, the data storage device is an NVMeoF device, and the NVMeoF device determines that the command is an NVMeoF command for an image search query (601). The NVMeoF device can receive various NVMeoF commands from the application, and the NVMeoF device can determine an image search query from the received NVMeoF commands for further processing.

According to one embodiment, the data storage device can arbitrate among the submission queues received from the application 600 (602). In one embodiment, the arbitration and the subsequent selection of an associated command can be performed by a central control unit 111 shown in FIG. 1. The arbitration by the data storage device determines a submission queue to extract from the submission queues. Once a submission queue is extracted by arbitration, the data storage device determines a proper I/O request command to process the request contained in the submission queue (603). If the I/O request command to process the submission queue is an image search query command (604), the data storage device starts a preprocessing process 606 to retrieve images that matches the image search request. In one embodiment, the preprocessing process 606 is performed by an integrated preprocessor, for example, the preprocessor 112 shown in FIG. 1. If the I/O request command to process the submission queue is not an image search query command, for example, a read/write request to the data stored in the data storage device, the data storage device treats the request associated with the submission queue as a normal request and processes it normally (605).

According to one embodiment, the data storage device preprocesses the image search request to reduce the size of the image received in the submission queue to a normalized format in preparation for processing. For example, the data storage device converts the image from a YUV color format to a RGB color format and further scales the converted image to a 256×256 pixel image (607). The data storage device can further convert this intermediate image to a monochromatic bitmap image and sharpen edges to generate a normalized image (608). The data storage device places the normalized image and associated search criteria into an input buffer (609) to start a feature extraction process 610.

The feature extraction process 610 starts with an activation of a CNN engine that is internal to the data storage device (611). For example, the CNN engine corresponds to the convolution engine shown in FIG. 1. The CNN engine submits the normalized image to one or more procedural reduction layers, herein referred to as CNN layers, to extract specific features from the normalized image. For each CNN layer, the CNN engine computes a neural descriptor (613), compresses the neural descriptor (614), and stores the result in an output buffer (615). These processes 613-615 iteratively continue for all CNN layers.

When all the CNN layers are complete (612), the data storage device (e.g., the processing unit 120 of FIG. 1 or the CNN engine) initiates a search process 616. The search process 616 starts with fetching an image from the dataset stored in the data storage device (618). After fetching the image, the search process 616 parses metadata from the fetched image (619) and extracts stored features (620). The stored features for the fetched image can be partial features extracted by the extraction process 610. The search process 616 utilizes the extracted features in the feature extraction process 610 as key values in combination with the query's associated search criteria.

The data storage device can successively examine candidate database images from the dataset stored in the memory array of the data storage device, compare the stored features (e.g., keys) of the candidate database images with the extracted features of the image data in the feature extraction process 610 based on the search criteria (621) and calculate Hamming distances to determine a closeness of match for each of the candidate database images (622). The calculated Hamming distances are stored in an output buffer (623) for a selection process 624. These processes 618-623 repeat to generate a list of candidate query responses that the data storage device can algorithmically examine using Hamming distances as closeness of match.

The search process 616 can process search queries in various ways depending on various parameters including, but not limited to, the size of the dataset and a number of nearest matches to return. According to embodiment, the search process 616 searches binary codes. For example, the search process 616 uses a search query's K-nearest neighbors (K being a number of nearest neighbors) within a Hamming distance for a binary code similarity measure. Binary codes are not necessarily distributed uniformly over a Hamming's space. Therefore, the search process 616 may not be able to set a fixed Hamming radius to ensure finding of the K number of matching data. The maximum Hamming radius used in the search process 616 may depend on the K data, the length of the binary code, and the image query. Generally, the longer the binary code is, the larger maximum radius is.

According to one embodiment, the search process 616 can employ several methods to ensure finding of the K data. In describing the search process 616, the following terminology will be used in accordance with the definitions set out below. Q is a length of a binary code, S is a substring of the binary code, R is a Hamming radius, N is a size of the dataset size, and K is a number of nearest neighbors to search or being searched.

According to one embodiment, the search process 616 applies a parallel linear scan with or without re-ranking. During the parallel linear scan, the search process 616 compares all binary codes until the K number of neighbors with less than the Hamming radius R is searched. For example, an optimal Hamming radius R can be obtained by:

$$[R-\log 10(K)]/Q=0.1.$$

However, the search process 616 may tweak and adapt the constant 0.1 based on the dataset and the search criterion. For example, if a binary code is 64-bit long and the search process 616 searches for 10 nearest neighbors, the search process 616 can collect data with a Hamming distance up to:

$$R-\log(10)=0.1*64 \rightarrow R=7.$$

In another example, if a binary code is 128-bit long, and the search process 616 searches for 1000 nearest neighbors, the search process 616 can collect data with a Hamming radius up to:

$$R-\log(1000)=0.1*128 \rightarrow R=15.$$

In this case, the search process 616 may or may not return the 1000 nearest neighbors because the search process 616 is greedy to find the first K neighbors. Although this process may not be efficient, this process be the simplest approach requiring the least storage space for the binary codes and the image's address. In one embodiment, the search process 616 may employ multiple parallel XOR engines to work on different binary code chunks to facilitate the search process to efficiently and quickly searches for the matching data.

According to one embodiment, the search process 616 uses a single hash table. If a short binary code length (e.g., 16 to 32 bits) is used, and if the dataset is large (e.g., larger than 10^9 images), the search process 616 can use a single hash table for binary code indexing. The search process 616 searches for the entries that have the same binary code and a Hamming radius of 1. In this case, many entries might be empty.

According to one embodiment, the search process 616 uses a multi-index hash table. In this case, the search process 616 can create multiple small hash tables and index them based on binary code substrings. In one embodiment, the search process 616 divides Q bits of the binary code to M disjoint substrings. The substring length S is chosen by and (N) where:

$$S=\log 2(N)=M=Q/S.$$

When a search query arrives, the search process 616 checks the query binary code with all M hash tables. In each hash table, the search process 616 can check entries with the R'=R/M distance.

For example, the dataset includes approximately 2 million images, and a 64-bit binary code is used, and the search process 616 searches for 100 nearest neighbors. In this case, the search process 616 divides the binary code into 21 ($\log_2(2M)$) bit substrings, and 3 hash tables are required. The optimal R value can be obtained by: R=0.1*64+log 10(100) =9 bits, and R' can be 9/3=3. In this case, the query binary code is divided into 3 pieces, and the search process 616 searches for a Hamming radius of 3 in each hash table.

According to one embodiment, the data storage system can include a plurality of data storage devices. A front-end data storage device can act like a cache and keep the hash tables. Based on the returned data from searching the hash tables, the search process 616 can access the main data storage for retrieving images that matches the image search request.

After the data storage device examines all the stored candidate images (617), a selection process 624 starts. The selection process 624 compares the computed Hamming distances for the candidate images to a threshold value (626). The threshold value used in the selection process 624 can be an arbitrary constant or provided with the image search query. If the Hamming distance is shorter than the threshold (627), the image is selected (628), and the selected image is stored in the output buffer (629). These processes 625-629 repeat to create a list of selected images, and the data storage device returns the list to the requesting application 600.

According to one embodiment, a data storage device includes a memory array for storing data; a host interface for providing an interface with a host computer running an application; a central control unit configured to receive a command in a submission queue from the application and initiate a search process in response to a search query command; a preprocessor configured to reformat data contained in the search query command based on a type of the data and generate a reformatted data; and one or more data processing units configured to extract one or more features from the reformatted data and perform a data operation on the data stored in the memory array in response to the search query command and return matching data from the data stored in the memory array to the application via the host interface.

The data storage device may be a non-volatile memory express over fabrics (NVMeoF) device.

The search query command may be an NVMeoF command received over an Ethernet connection.

The search query command may include an image data, and the preprocessor may be configured to convert the image data in an RGB format.

The one or more data processing units may be configured to generate a plurality of binary codes corresponding to the one or more extracted features, and store the one or more extracted features in an input buffer.

Each of the one or more data processing units may include one or more convolution engines (CEs). Each of the one or more convolution engines may be configured to extract the one or more features in a convolutional neural network (CNN) layer.

Each of the one or more convolution engines may be configured to compute a neural descriptor for each convolutional neural network (CNN) layer, compress the neural descriptor, and store the one or more extracted features in an output buffer.

The one or more data processing units may further be configured to extract stored features for the data stored in the memory array and compare the stored features with the extracted features of the reformatted data.

The one or more data processing units may further be configured to calculate a Hamming distance for each of the data stored in the memory array.

The one or more data processing units may further be configured to select the matching data from the data stored in the memory array based on the Hamming distance, store the matching data in the output buffer, and transmit the matching data to the application over the host interface.

The data storage device may further include a memory manager including one or more graphics processing units (GPUs) configured to perform machine learning on the data stored in the memory array.

A method for operating a data storage device includes: receiving a command in a submission queue from an application running on a host computer; initiating a search process in response to a search query command; generating a reformatted data by changing a format of data contained in the search query command based on a type of the data; extracting one or more features from the reformatted data; performing a data operation on data stored in a memory array of the data storage device in response to the search query command; and returning matching data from the data stored in the memory array to the application via a host interface established between the host computer and the data storage device.

The data storage device may be a non-volatile memory express over fabrics (NVMeoF) device.

The search query command may be an NVMeoF command received over an Ethernet connection.

The method may further include converting an image data included in the search query command in an RGB format.

The method may further include: generating a plurality of binary codes corresponding to the one or more extracted features; and storing the one or more extracted features in an input buffer.

The features may be extracted using one or more convolution engines (CEs) of the data storage device. Each of the one or more convolution engines may extract the one or more features in a convolutional neural network (CNN) layer.

Each of the one or more convolution engines may be configured to compute a neural descriptor for each convolutional neural network (CNN) layer, compress the neural descriptor, and store the one or more extracted features in an output buffer.

The method may further include: extracting stored features for the data stored in the memory array; and comparing the stored features with the extracted features of the reformatted data.

The method may further include: calculating a Hamming distance for each of the data stored in the memory array.

The method may further include: selecting the matching data from the data stored in the memory array based on the Hamming distance; and storing the matching data in the output buffer; and transmitting the matching data to the application over the host interface.

The data storage device may further include a memory manager including one or more graphics processing units (GPUs) configured to perform machine learning on the data stored in the memory array.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present disclosure is that it valuably supports and services the historical trend of reducing costs, simplifying systems, and increasing performance. These and other valuable aspects of an embodiment of the present disclosure consequently further the state of the technology to at least the next level.

While the present disclosure has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A data storage device comprising:
a memory for storing data;
a host interface compatible with non-volatile memory express over fabrics (NVMeoF) and capable of receiving a command and a first data associated with the command from an external application, the first data comprising image data; and
a processor extracting a feature from the image data, performing a data operation on the data stored in the memory based on the command, identifying matching data among the data stored in the memory based on the feature, and returning the matching data to the external application via the host interface.

2. The data storage device of claim 1, further comprising a preprocessor generating a reformatted data by reformatting the first data received from host interface based on at least one of the command and a type of the first data, and extracting the feature from the reformatted data.

3. The data storage device of claim 2, wherein the first data is an image data, and the reformatted data is in a red/green/blue (RGB) format.

4. The data storage device of claim 1, wherein the data storage device is attachable to a fabric compatible with the NVMeoF.

5. The data storage device of claim 1, wherein the processor generates a binary code corresponding to the feature.

6. The data storage device of claim 1, wherein the processor includes a convolution engine (CE) that extracts the feature in a convolutional neural network (CNN) layer.

7. The data storage device of claim 6, wherein the convolution engine computes a neural descriptor for the CNN layer and compresses the neural descriptor.

8. The data storage device of claim 1, wherein the processor further extracts a stored feature for the data stored in the memory and compares the stored feature with the feature of the first data.

9. The data storage device of claim 8, wherein the processor further calculates a Hamming distance for the data stored in the memory.

10. The data storage device of claim 9, wherein the processor further selects the matching data from the data stored in the memory based on the Hamming distance.

11. A method comprising:
receiving, at a data storage device, a command and a first data associated with the command from an external application via a host interface between a host computer, the host interface being compatible with non-volatile memory express over fabrics (NVMeoF), and the first data comprising image data;
extracting, in the data storage device, a feature from the image data;
performing, in the data storage device, a data operation on data stored in a memory of the data storage device based on the command;
identifying matching data among the data stored in the memory based on the feature; and
returning the matching data to the external application via the host interface.

12. The method of claim 11, further comprising:
generating a reformatted data by reformatting the first data received from host interface based on at least one of the command and a type of the first data; and
extracting the feature from the reformatted data.

13. The method of claim 12, wherein the first data is an image data, and the reformatted data is in a red/green/blue (RGB) format.

14. The method of claim 11, wherein the data storage device is attachable to a fabric compatible with the NVMeoF.

15. The method of claim 11, further comprising generating a binary code corresponding to the feature.

16. The method of claim 11, further comprising:
extracting a stored feature for the data stored in the memory; and
comparing the stored feature with the feature of the first data.

17. The method of claim 16, further comprising:
calculating a Hamming distance for the data stored in the memory.

18. The method of claim 17, further comprising:
selecting the matching data from the data stored in the memory based on the Hamming distance.

19. A method comprising:
receiving, at a data storage device, a command and a first data associated with the command from an external application via a host interface between a host computer, the host interface being compatible with non-volatile memory express over fabrics (NVMeoF);
extracting, in the data storage device, a feature from the first data;
performing, in the data storage device, a data operation on data stored in a memory of the data storage device based on the command;
identifying matching data among the data stored in the memory based on the feature; and
returning the matching data to the external application via the host interface,
wherein the feature is extracted using a convolution engine of the data storage device, and the convolution engine extracts the feature in a convolutional neural network (CNN) layer.

20. The method of claim 19, wherein the convolution engine computes a neural descriptor for the CNN layer and compresses the neural descriptor.

* * * * *